Jan. 5, 1932. A. ADDICKS 1,839,454
SAFETY DEVICE FOR VEHICLES, PARTICULARLY POWER DRIVEN VEHICLES
Filed Aug. 18, 1930
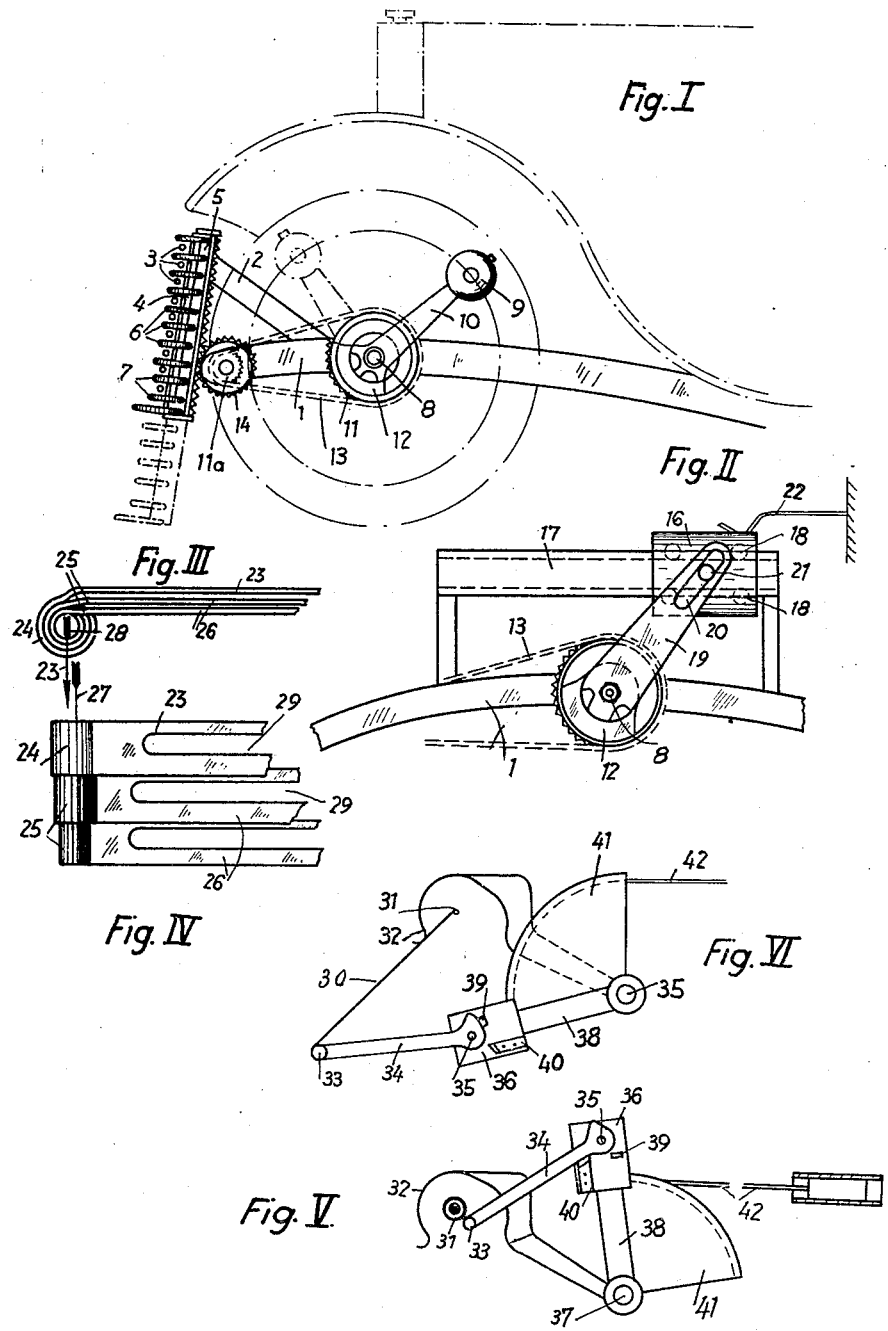
Inventor:
Albert Addicks Patented Jan. 5, 1932

1,839,454

UNITED STATES PATENT OFFICE

ALBERT ADDICKS, OF BOITWARDEN, NEAR BRAKE, GERMANY

SAFETY DEVICE FOR VEHICLES, PARTICULARLY POWER DRIVEN VEHICLES

Application filed August 18, 1930. Serial No. 476,074.

This invention relates to a safety device for vehicles, particularly motor-cars, which is acted upon by a pendulum sliding- or rolling weight, according to U. S. A. patent application Serial No. 336,482 dated January 31st, 1929.

The novelty consists in that the weight does not act directly on the safety cage, but through the intermediary of an intermediate gear, such as a chain with sprocket wheels, a spur wheel gearing or the like, the safety cage being rigidly connected with the chassis of the vehicle and on the bars of which guide bars for racks carrying other cage bars are arranged, which can be shifted vertically by a known gearing. Further, according to the invention the safety cage is composed of bands of rigid material, arranged one below another like Venetian blinds, the ends of the bands being telescopic one in another and adapted to be lowered and raised by wire ropes connected with the weights. Moreover the lifting links of the weights are arranged adjustable on the driving wheels for the intermediate gears, and the shiftable cage bars are bent at their ends and surround the rigid cage bars. The invention also provides for the track of the weight being slightly raised towards the front in order to obtain an automatic rolling back of the sliding body on the braking effect ceasing.

Several embodiments of the invention are illustrated by way of example in the accompanying drawings in which:

Fig. I shows in side elevation the arrangement of a shiftable safety cage fitted to a motor car with an actuating mechanism shown by way of example.

Fig. II shows in elevation a modified actuating mechanism for the safety device.

Fig. III is a partial longitudinal section through a Venetian blind extensible buffer bar.

Fig. IV is a partial rear view of the buffer bar shown in Fig. III.

Figs. V and VI show diagrammatically a modified form of construction in different operating positions.

According to Fig. I the safety device consists of a safety cage rigidly fixed on the vehicle, for example on the chassis 1, by means of arms 2. The horizontal rods 3 or the like of this rigid safety cage are fastened on two rods 4, held by the holding arms 2. On these rods 4 racks 5 are slidably mounted, on which a suitable number of safety bars 6 are fastened. These bars are bent eye-like at both ends, surrounding the ends of the bars 3. The movement of the racks 5 in the guides 4 can be effected in any suitable manner, for example by pendulums oscillating around pivot bolts 8, the pendulum weights 9 being arranged rigidly or adjustably mounted on the pendulum arms 10.

The rotary movement of the pendulum arms 10, caused by the inertia of the oscillatably mounted pendulum weights 9, is transmitted to the sprocket wheels 11 and 11a, wheels 11 being rotatable on the pivot bolts 8. The pendulum arms 10 can be adjusted on the sprocket wheels 11 in any suitable manner, for example by suitably constructing same and by correspondingly constructing the lower end 12 of the pendulum arm. The transmission of the movement of the sprocket wheels 11 to the racks 5 is effected in suitable manner for example by chains 13 through suitable transmission onto the sprocket wheel 14 or, as may be necessary by spur wheel- bevel wheel- lever- or similar gearing, the outermost sprocket wheel 14 engaging in the teeth 15 of the racks 5.

According to Fig. II of the drawings the movement of the adjustable cage is effected by rolling weights 16, which are arranged easily running in guides 17, fitted on the arms of the chassis 1, employing balls 18, rollers or the like. The guide 17 on the roller track rises slightly towards the front so that the weight 16, can easily negotiate this incline, when the car is braked, but on the stopping of the car immediately run back on the track, downwardly inclined towards the rear, and remains invisible until the car starts again. The transmission of the movement of the sliding weights 16 to the spur wheels 11 is effected in the same manner, as shown in Fig. I, using the link 19, which is rigidly and adjustably connected at its accordingly shaped end with the sprocket wheel 11. These links 19 are each provided at the upper end with a slot 20, in which a guide pin 21 arranged on the sliding weight 16 engages. The transmission of movement is also effected by chain- spur- or bevel wheel-gearing in a similar manner to that shown in Fig. I. In order to prevent the sliding weight 16 or pendulum weight 9 from changing its position on the slightest reduction of speed, a spring 22 or other retaining device is provided, so that the safety device only becomes operative at a certain reduction of speed.

The form of construction of the safety cage, wherein the safety cage serves as buffer bar or is formed by the buffer bar, is shown in Figs. III and IV. Fig. III shows this form of construction in part top plan view, and Fig. IV is a partial front elevation.

This safety device consists of separate steel or other bands. The upper outer band 23, rigidly fixed on the car, extends at each end in a bent portion 24, in which a plurality of bends 25 of bands 26, situated behind the rigidly mounted band 23 are slidably guided. On the innermost bend 25 a pull rope or chain indicated by the arrow 27 in Fig. IV is fastened, which running over a pulley 28, is connected with an oscillating- sliding- or rolling weight in suitable manner as above described. If this weight swings towards the front, the chain 27 gives way, and the bands 23 descend as shown in Fig. IV. Any desired number of such bands 26 may be arranged so as to cover the car or the wheels to within a short distance of the ground. The upper edges of the bends 25 sliding one within another can be supported on a suitable support on the lower edge of the bend 24 or of the bend 25, which surrounds and guides it so that the bands 23 in sliding downward may be provided with suitable apertures 29, or any other suitable device, such as racks, sprocket wheels and the like may also be used instead of the bends 24, 25 sliding one within another under the action of the chain 27.

Figs. V and VI show a form of construction in which the catching cage proper is formed of a cloth band arranged shutter-like, which rolls off in the event of a sudden reduction of travelling speed to within a few centimeters above the ground and assumes a protecting position in front of the front wheels. The cloth band 30, for which any suitable material may be used, is wound on an axle 31 which, in the construction shown, is arranged in the lowermost hollow buffer bar 32 of the vehicle open at the bottom. The cloth band is of necessary width which depends upon that of the vehicle and is connected at the free edge on a rod 33, connected at each end with a one armed lever 34, which oscillates around the pivot pins 35 on the weight 36. The weight 36 forms the head of a lever 38, oscillatable around the axle 37. The swinging range of the lever 34 is limited by stops 39 and 40 on the weight 36. A segment 41 is also fastened on the axle 37 and over the arc of said segment a rope 42 or the like is laid, the free end of said rope being fastened to the front of the segment. The wire rope 42 extends to the rear part of the vehicle and is there connected to a rolling weight, which moves in a plane slightly inclined towards the front.

By a slight pull exerted during the normal travel of the vehicle on the rope 42 the device is maintained in the position shown in Fig. V. The axle 31 for the cloth band 30 is acted upon by a torsion spring, which winds the band on the axle 31. If the speed of the vehicle is suddenly reduced, the weight connected to the rope 42 moves forward and upward, owing to inertia and the weight 36 moves downwards, as shown in Fig. VI so that the cloth band unrolls and assumes a protecting position in front of the front wheels of the vehicle within a few centimeters from the ground. If the travelling speed is again increased, the weight fastened on the rope 42 again moves the parts 34, 36, 38 into the position shown in Fig. V so that the torsion spring again winds the cloth band 30 onto the axle 31.

I claim:—

1. A safety device for vehicles, especially for motor cars, comprising in combination a pendulum weight, a safety guard adapted to be actuated by said weight, a chain gear connecting said weight with said guard, and sprocket wheels adapted to guide said chain.

2. A safety device for vehicles, especially for motor cars, comprising in combination a rolling weight, a safety guard adapted to be actuated by said weight, a chain gear connecting said weight with said guard, and sprocket wheels adapted to guide said chain.

3. A safety device for vehicles, especially for motor cars, comprising in combination a pendulum weight, a safety guard adapted to be actuated by said weight, and a spur wheel gearing connecting said weight with said guard.

4. A safety device as specified in claim 1, comprising in combination with the weight and the guard, an intermediate gearing between said weight and said guard, driving wheels for said intermediate gearing, and links for said weight, adjustable on said driving wheels.

5. A device for vehicles especially for motor cars, comprising in combination with the guard, an inclined plane, a rolling weight, adapted to roll on said plane on the acceleration of the vehicle, and a rope adapted to be pulled by said weight and to bring said guard into its inoperative position.

6. A device as specified in claim 6, comprising in combination with the weight, a path slightly rising towards the front on which said weight is adapted to roll.

7. A device as specified in claim 1, comprising in combination with the pendulum weight, a lever pendulating with said weight, an oscillatable lever on said weight, a rod on the free end of said lever, and a cloth band adapted to be moved forward to within a few centimeters of the ground by said oscillatable lever.

8. A safety device as specified in claim 1, comprising in combination with the safety guard formed by a cage rigidly connected with the chassis of the vehicle, bars of said cage, guides on said bars, racks, guided in said guides, bars carried by said racks, and gearings adapted to shift said racks vertically.

9. A device as specified in claim 1, comprising in combination rigid cage bars, shiftable cage bars, and eyes on the ends of said shiftable cage bars adapted to surround said rigid cage bars.

10. A safety device as specified in claim 1, comprising in combination with the weights and the safety guard, a plurality of bands composed of rigid material arranged shutter blind-wise one below another the ends on said bands adapted to telescope one within another, and a wire rope connecting said bands with said weights adapted to raise and lower said bands.

11. A safety device for vehicles especially for motor cars, comprising in combination a movable weight, a safety guard adapted to be actuated by said weight, and an intermediate gear adapted to transmit the movement of said weight to said guard.

In testimony whereof I affix my signature.

ALBERT ADDICKS.